US009882801B2

(12) United States Patent
Archer et al.

(10) Patent No.: US 9,882,801 B2
(45) Date of Patent: *Jan. 30, 2018

(54) PROVIDING FULL POINT-TO-POINT COMMUNICATIONS AMONG COMPUTE NODES OF AN OPERATIONAL GROUP IN A GLOBAL COMBINING NETWORK OF A PARALLEL COMPUTER

(71) Applicant: INTERNATIONAL BUSINESS MACHINES CORPORATION, Armonk, NY (US)

(72) Inventors: Charles J. Archer, Rochester, MN (US); Daniel A. Faraj, Rochester, MN (US); Todd A. Inglett, Rochester, MN (US); Joseph D. Ratterman, Seattle, WA (US)

(73) Assignee: International Business Machines Corporation, Armonk, NY (US)

(*) Notice: Subject to any disclaimer, the term of this patent is extended or adjusted under 35 U.S.C. 154(b) by 1341 days.

This patent is subject to a terminal disclaimer.

(21) Appl. No.: 13/778,581

(22) Filed: Feb. 27, 2013

(65) Prior Publication Data

US 2013/0176904 A1    Jul. 11, 2013

Related U.S. Application Data

(63) Continuation of application No. 11/834,159, filed on Aug. 6, 2007, now Pat. No. 8,423,663.

(51) Int. Cl.
*H04L 12/751* (2013.01)
*G06F 15/173* (2006.01)

(52) U.S. Cl.
CPC ............ *H04L 45/02* (2013.01); *G06F 15/173* (2013.01)

(58) Field of Classification Search
None
See application file for complete search history.

(56) References Cited

U.S. PATENT DOCUMENTS 5,265,207 A    11/1993 Zak et al.
5,333,268 A    7/1994 Douglas et al.
(Continued)

OTHER PUBLICATIONS

Rosen et al., "Multiprotocol Label Switching Architecture", Network Working Group Request for Comments (RFC 3031), Jan. 2001, pp. 1-78, IETF.org (online publication), URL: http://www.ietf.org/rfc/rfc3031.txt.

(Continued)

*Primary Examiner* — Khaled Kassim
(74) *Attorney, Agent, or Firm* — Brandon C. Kennedy; Feb Cabrasawan; Kennedy Lenart Spraggins LLP

(57) ABSTRACT

Methods, apparatus, and products are disclosed for providing full point-to-point communications among compute nodes of an operational group in a global combining network of a parallel computer, each compute node connected to each adjacent compute node in the global combining network through a link, that include: receiving a network packet in a compute node, the network packet specifying a destination compute node; selecting, in dependence upon the destination compute node, at least one of the links for the compute node along which to forward the network packet toward the destination compute node; and forwarding the network packet along the selected link to the adjacent compute node connected to the compute node through the selected link.

15 Claims, 10 Drawing Sheets

(56) References Cited

U.S. PATENT DOCUMENTS

| | | |
|---|---|---|
| 5,530,809 A | 6/1996 | Douglas et al. |
| 5,666,361 A | 9/1997 | Aznar et al. |
| 6,094,715 A | 7/2000 | Wilkinson et al. |
| 6,622,233 B1 | 9/2003 | Gilson |
| 7,000,033 B2 | 2/2006 | Lee |
| 7,007,189 B2 | 2/2006 | Lee et al. |
| 7,051,185 B2 | 5/2006 | Gilson |
| 7,099,341 B2 | 8/2006 | Lingafelt et al. |
| 7,185,138 B1 | 2/2007 | Galicki |
| 7,483,998 B2 | 1/2009 | Rabinovitch |
| 7,515,600 B1* | 4/2009 | Savage ............... H04L 45/02 370/426 |
| 7,673,011 B2 | 3/2010 | Archer et al. |
| 7,773,618 B2 | 8/2010 | Leonard et al. |
| 8,144,709 B2 | 3/2012 | Hazard |
| 8,345,548 B2 | 1/2013 | Gusat |
| 8,902,892 B2 | 12/2014 | Hoenicke |
| 2002/0049608 A1 | 4/2002 | Hartsell et al. |
| 2003/0126289 A1 | 7/2003 | Aggarwal et al. |
| 2003/0128832 A1* | 7/2003 | Beltran ............... H04Q 3/0025 379/229 |
| 2003/0137978 A1 | 7/2003 | Kanetake |
| 2004/0042405 A1* | 3/2004 | Nesbitt ............... G01C 21/3446 370/238 |
| 2004/0078493 A1 | 4/2004 | Blumrich et al. |
| 2005/0002354 A1* | 1/2005 | Kelly ............... H04L 45/04 370/329 |
| 2005/0091387 A1* | 4/2005 | Abe ............... G06F 9/4405 709/228 |
| 2005/0201356 A1 | 9/2005 | Miura et al. |
| 2006/0101158 A1 | 5/2006 | Shand et al. |
| 2006/0193333 A1* | 8/2006 | Baughan ............... H04L 45/02 370/400 |
| 2006/0227774 A1 | 10/2006 | Hoenicke |
| 2007/0147377 A1* | 6/2007 | Laroia ............... H04L 45/00 370/392 |
| 2007/0280117 A1* | 12/2007 | Katz ............... H04L 12/24 370/238 |
| 2008/0084827 A1 | 4/2008 | Archer et al. |
| 2008/0107136 A1* | 5/2008 | Joo ............... H04L 12/64 370/503 |
| 2008/0112325 A1* | 5/2008 | Sivakumar ............... H04L 45/22 370/238 |
| 2008/0151841 A1* | 6/2008 | Yi ............... H04L 45/124 370/338 |
| 2008/0301704 A1 | 12/2008 | Archer et al. |
| 2009/0037598 A1 | 2/2009 | Archer et al. |
| 2009/0043912 A1 | 2/2009 | Archer et al. |
| 2009/0043988 A1 | 2/2009 | Archer et al. |
| 2009/0138892 A1 | 5/2009 | Almasi et al. |
| 2009/0296719 A1* | 12/2009 | Maier ............... H04L 45/12 370/400 |
| 2010/0014523 A1 | 1/2010 | Archer et al. |
| 2010/0158002 A1* | 6/2010 | Ogasahara ............... H04L 45/00 370/392 |
| 2012/0189012 A1 | 7/2012 | Archer et al. |

OTHER PUBLICATIONS

Sedgewick, "Algorithms in C++ Part 5: Graph Algorithms, Third Edition", Addison-Wesley Professional, Dec. 2001, pp. 1-15, Pearson Education, Inc., USA.

Moreira et al., "The Blue Gene/L Supercomputer: A Hardware and Software Story", Intl Journal of Parallel Programming, vol. 35, No. 3, Jun. 2007, p. 181-206.

Faraj et al., "A Message Scheduling Scheme for All-to-All Personalized Communication on Ethernet Switched Clusters", IEEE Trans on Parallel and Distributed Systems, vol. 18, No. 2, Feb. 2007, pp. 264-76, IEEE Computer Society, USA.

Office Action, U.S. Appl. No. 11/832,955, dated Jun. 23, 2009, pp. 1-13.

Office Action, U.S. Appl. No. 11/832,955, dated Nov. 30, 2011, pp. 1-18.

Office Action, U.S. Appl. No. 12/176,840, dated Apr. 23, 2010, pp. 1-23.

Office Action, U.S. Appl. No. 12/176,840, dated Mar. 11, 2011, pp. 1-25.

Office Action, U.S. Appl. No. 13/440,252, dated Jan. 3, 2014, pp. 1-26.

Office Action, U.S. Appl. No. 11/834,159, dated Jun. 10, 2009, pp. 1-16.

Final Office Action, U.S. Appl. No.11/834,159, dated Dec. 9, 2009, pp. 1-17.

Office Action, U.S. Appl. No. 11/834,159, dated Dec. 13, 2011, pp. 1-21.

Final Office Action, U.S. Appl. No. 11/834,159, dated Mar. 29, 2012, pp. 1-7.

Notice of Allowance, U.S. Appl. No. 11/834,159, dated Nov. 27, 2012, pp. 1-17.

\* cited by examiner

| Forwarding Table For Node 1 ||
|---|---|
| Dest. Node ID | Link ID |
| 0 | B |
| 2 | B |
| 3 | A |
| 4 | C |
| 5 | B |
| 6 | B |

| Forwarding Table For Node 1 ||
|---|---|
| Dest. Node ID | Link ID |
| 1 | B |
| 2 | C |
| 3 | B |
| 4 | B |
| 5 | C |
| 6 | C |

PROVIDING FULL POINT-TO-POINT COMMUNICATIONS AMONG COMPUTE NODES OF AN OPERATIONAL GROUP IN A GLOBAL COMBINING NETWORK OF A PARALLEL COMPUTER

CROSS-REFERENCE TO RELATED APPLICATION

This application is a continuation application of and claims priority from U.S. patent application Ser. No. 11/834,159, filed on Aug. 6, 2007.

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

Field of the Invention

The field of the invention is data processing, or, more specifically, methods, apparatus, and products for providing full point-to-point communications among compute nodes of an operational group in a global combining network of a parallel computer.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes. Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network generally supports point-to-point communications. A tree network, however, typically only supports communications where data from one compute node migrates through tiers of the tree network to a root compute node or where data is multicast from the root to all of the other compute nodes in the tree network. In such a manner, the tree network lends itself to collective operations such as, for example, reduction operations or broadcast operations. In the current art, however, the tree network does not lend itself to and is typically inefficient for point-to-point operations. As such, readers will appreciate any improvements in providing point-to-point communications among compute nodes of an operational group in a global combining network of a parallel computer.

SUMMARY OF THE INVENTION

Methods, apparatus, and products are disclosed for providing full point-to-point communications among compute nodes of an operational group in a global combining network of a parallel computer, each compute node connected to each adjacent compute node in the global combining network through a link, that include: receiving a network packet in a compute node, the network packet specifying a destination compute node; selecting, in dependence upon the destination compute node, at least one of the links for the compute node along which to forward the network packet toward the destination compute node; and forwarding the network packet along the selected link to the adjacent compute node connected to the compute node through the selected link.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
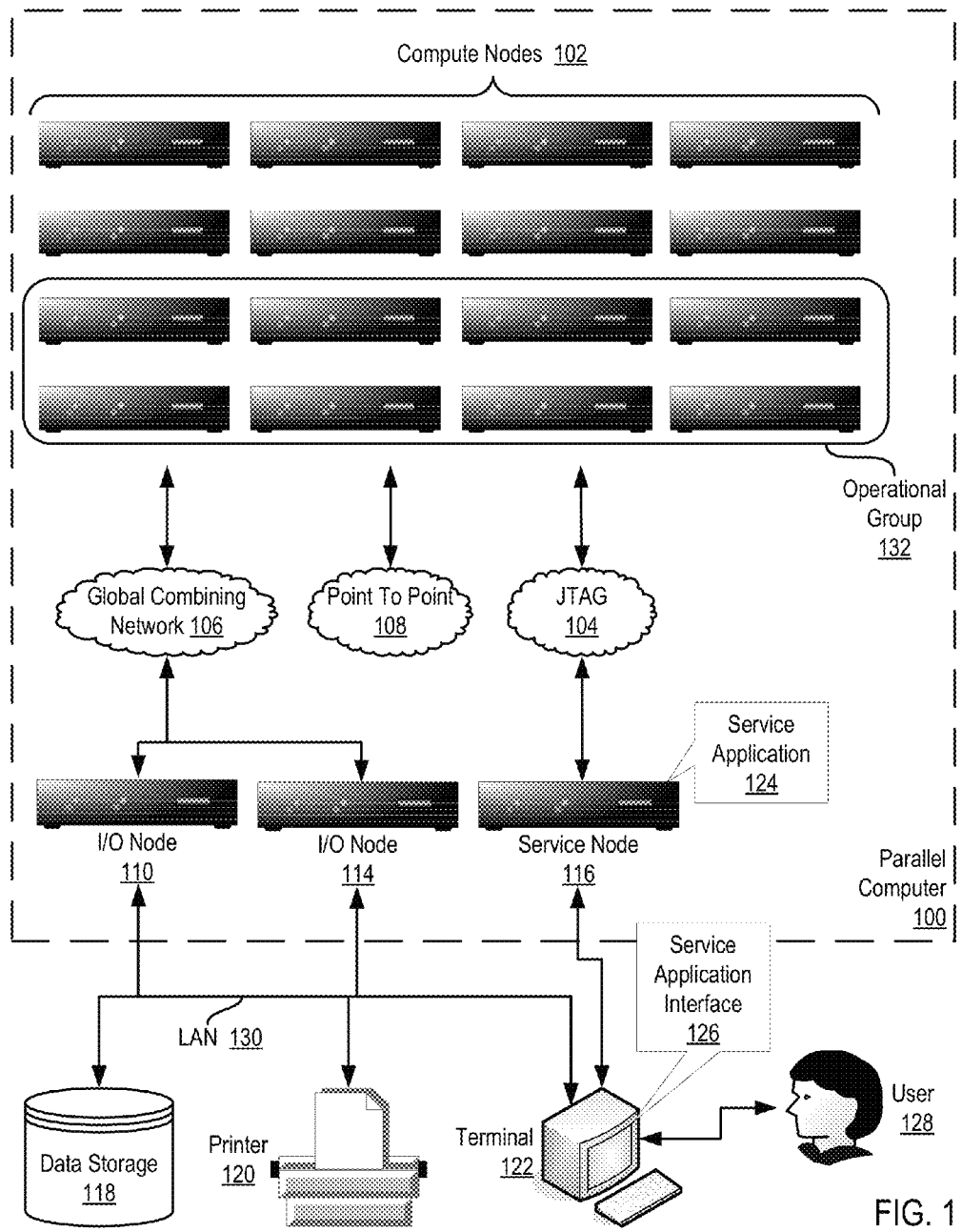
FIG. 1 illustrates an exemplary parallel computer for providing full point-to-point communications among compute nodes of an operational group in a global combining network according to embodiments of the present invention.

Exemplary methods, apparatus, and computer program products for providing full point-to-point communications among compute nodes of an operational group in a global combining network of a parallel computer according to embodiments of the present invention are described with reference to the accompanying drawings, beginning with FIG. 1. FIG. 1 illustrates an exemplary parallel computer for providing full point-to-point communications among compute nodes of an operational group in a global combining network according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The I/O nodes (110, 114) provide I/O services between compute nodes (102) and I/O devices (118, 120, 122). I/O nodes (110, 114) are connected for data communications I/O devices (118, 120, 122) through local area network ('LAN') (130) implemented using high-speed Ethernet. The parallel computer (100) also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the parallel computer of FIG. 1 operates generally for providing full point-to-point communications among compute nodes of an operational group in a global combining network according to embodiments of the present invention. Each compute node connects to each adjacent compute node in the global combining network (106) through a link. The parallel computer of FIG. 1 operates generally for providing full point-to-point communications among compute nodes of the operational group (132) in the global combining network (106) according to embodiments of the present invention by: receiving a network packet in a compute node, the network packet specifying a destination compute node; selecting, in dependence upon the destination compute node, at least one of the links for the compute node along which to forward the network packet toward the destination compute node; and forwarding the network packet along the selected link to the adjacent compute node connected to the compute node through the selected link.

In some embodiments of the present invention, selecting, in dependence upon the destination compute node, at least one of the links for the compute node along which to forward the network packet toward the destination compute node may include identifying, from a forwarding table, the link associated with the destination compute node. A forwarding table associates one of the links for the compute node to each of the other compute nodes in the operational group. The service application (124) on the service node (116) of FIG. 1 may be configured to support providing full point-to-point communications among compute nodes of an operational group in a global combining network according to embodiments of the present invention by: determining a network topology for the compute nodes of the operational group in the global combining network and creating a forwarding table for each compute node of the operational group in dependence upon the network topology.

In other embodiments of the present invention, selecting, in dependence upon the destination compute node, at least one of the links for the compute node along which to forward the network packet toward the destination compute node may also include: determining whether the destination compute node is one of the adjacent compute nodes for the compute node and selecting the link to the destination compute node if the destination compute node is one of the adjacent compute nodes for the compute node. Determining whether the destination compute node is one of the adjacent compute nodes for the compute node may be carried out using an adjacent node table that is created by the service node according to the network topology. Selecting, in dependence upon the destination compute node, at least one of the links for the compute node along which to forward the network packet toward the destination compute node may also include: identifying a receipt link on which the network packet was received by the compute node; determining whether the destination compute node is one of the adjacent compute nodes for the compute node; and selecting all of the links for the compute node except the receipt link if the destination compute node is not one of the adjacent compute nodes for the compute node.

The arrangement of nodes, networks, and I/O devices making up the exemplary system illustrated in FIG. 1 are for explanation only, not for limitation of the present invention. Data processing systems capable of providing full point-to-point communications among compute nodes of an operational group in a global combining network of a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Providing full point-to-point communications among compute nodes of an operational group in a global combining network according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of providing full point-to-point communications among compute nodes of an operational group in a global combining network according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
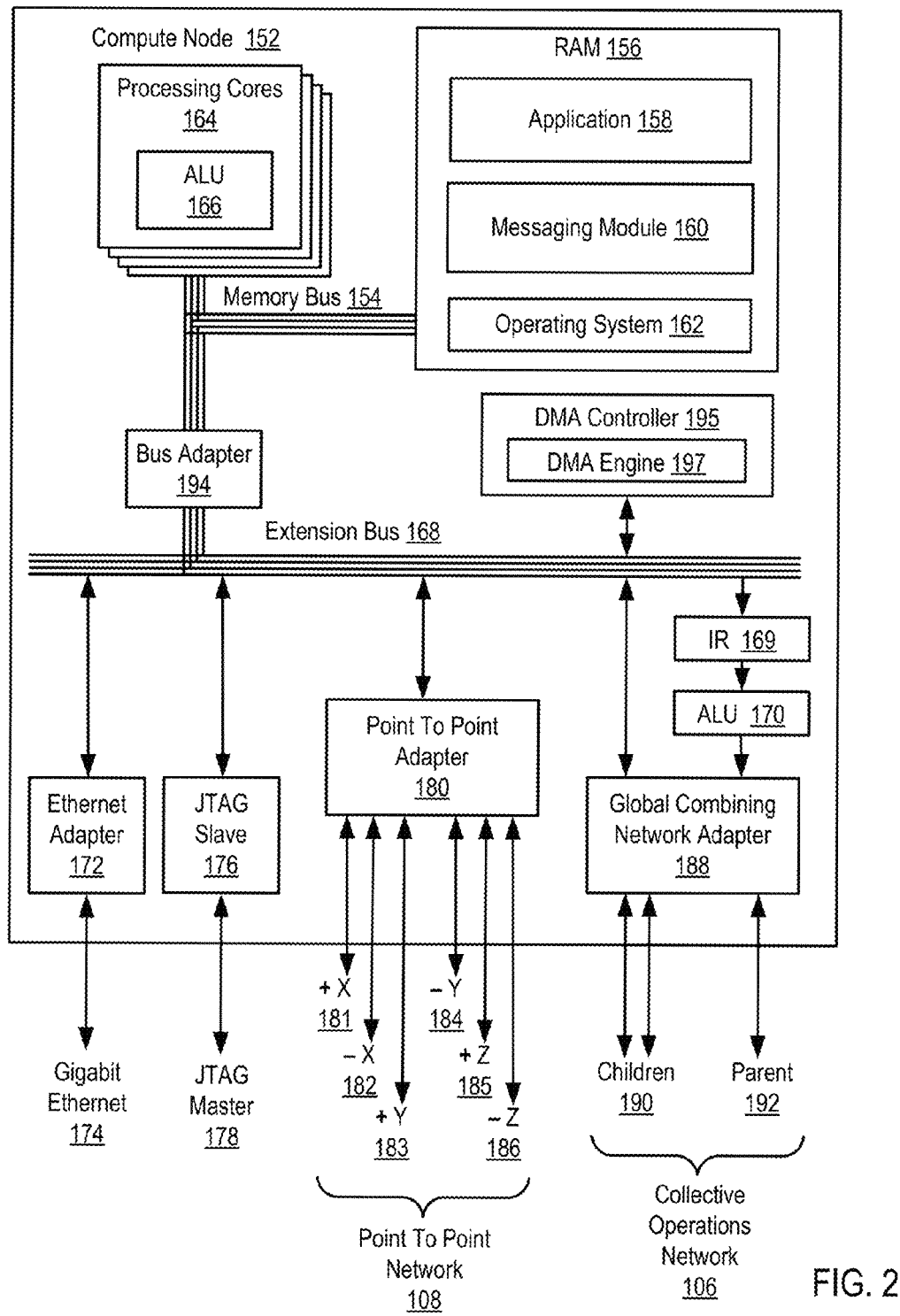
FIG. 2 sets forth a block diagram of an exemplary compute node useful in a parallel computer capable of providing full point-to-point communications among compute nodes of an operational group in a global combining network according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for providing full point-to-point communications among compute nodes of an operational group in a global combining network of a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in providing full point-to-point communications among compute nodes of an operational group in a global combining network of a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

As mentioned above, the compute node (152) of FIG. 2 is useful in a parallel computer capable of providing full point-to-point communications among compute nodes of an operational group in a global combining network according to embodiments of the present invention. In such a parallel computer according to embodiments of the present invention, each compute node is connected to each adjacent compute node in the global combining network through a link such as, for example, the bidirectional links to parent node (192) and child nodes (190). The parallel computer operates generally for providing full point-to-point communications among compute nodes of an operational group in a global combining network according to embodiments of the present invention by: receiving a network packet in a compute node, the network packet specifying a destination compute node; selecting, in dependence upon the destination compute node, at least one of the links for the compute node along which to forward the network packet toward the destination compute node; and forwarding the network packet along the selected link to the adjacent compute node connected to the compute node through the selected link.

Figure 3A:
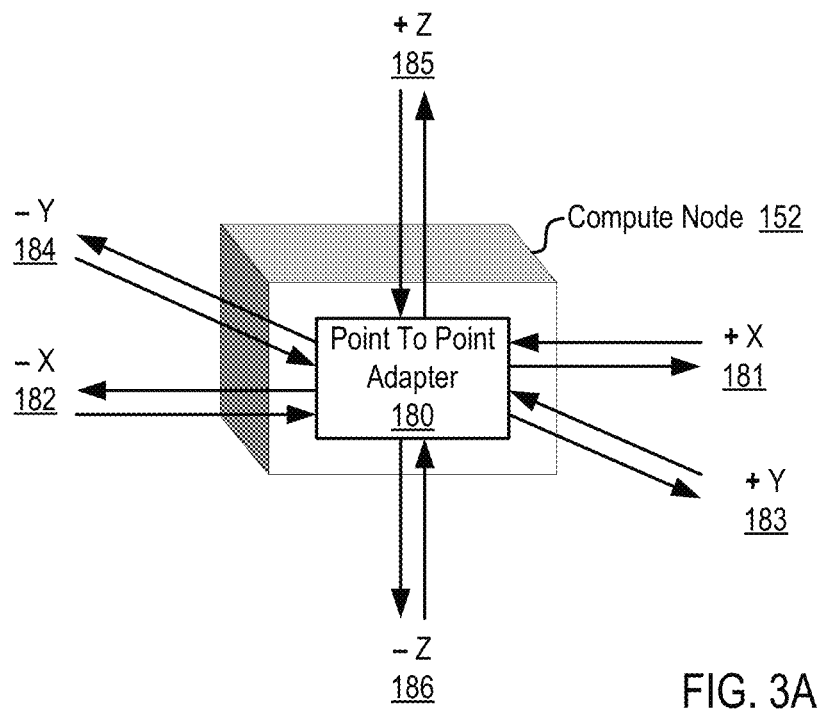
FIG. 3A illustrates an exemplary Point To Point Adapter useful in a parallel computer capable of providing full point-to-point communications among compute nodes of an operational group in a global combining network according to embodiments of the present invention.

For further explanation, FIG. 3A illustrates an exemplary Point To Point Adapter (180) useful in a parallel computer capable of providing full point-to-point communications among compute nodes of an operational group in a global combining network according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
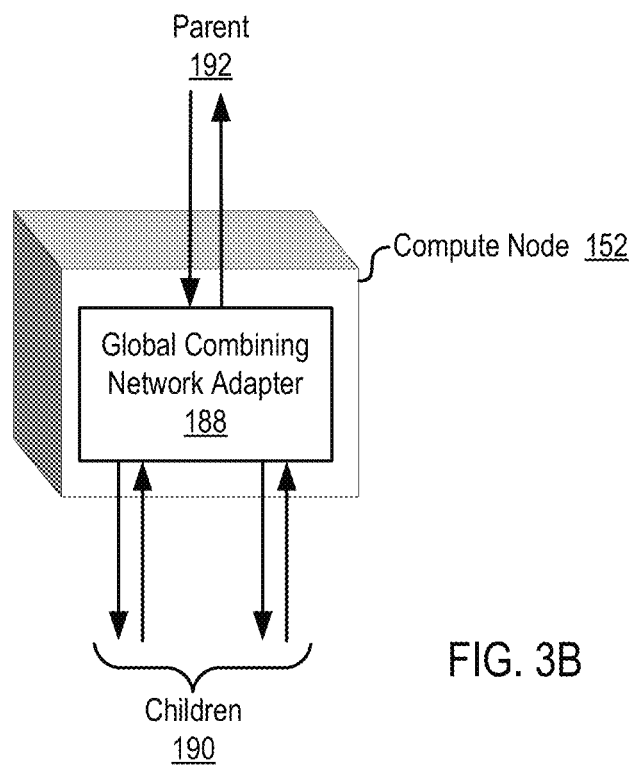
FIG. 3B illustrates an exemplary Global Combining Network Adapter useful in a parallel computer capable of providing full point-to-point communications among compute nodes of an operational group in a global combining network according to embodiments of the present invention.

For further explanation, FIG. 3B illustrates an exemplary Global Combining Network Adapter (188) useful in a parallel computer capable of providing full point-to-point communications among compute nodes of an operational group in a global combining network according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link form from two unidirectional data communications paths.

Figure 4:
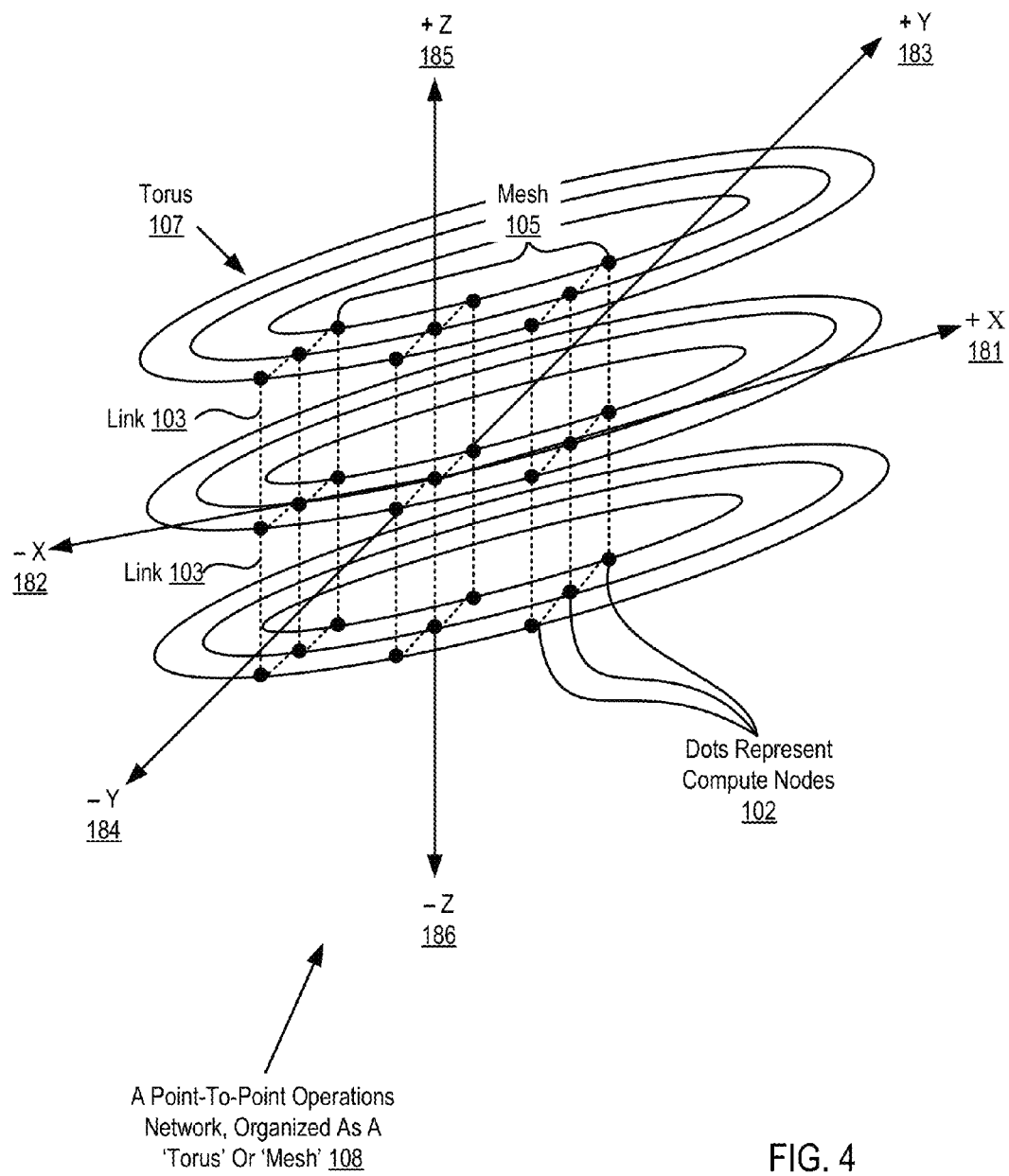
FIG. 4 sets forth a line drawing illustrating an exemplary data communications network optimized for point to point operations useful in a parallel computer capable of providing full point-to-point communications among compute nodes of an operational group in a global combining network according to embodiments of the present invention.

For further explanation, FIG. 4 sets forth a line drawing illustrating an exemplary data communications network (108) optimized for point to point operations useful in a parallel computer capable of providing full point-to-point communications among compute nodes of an operational group in a global combining network in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in providing full point-to-point communications among compute nodes of an operational group in a global combining network of a parallel computer in accordance with embodiments of the present invention may contain only a few compute nodes or may contain thousands of compute nodes.

Figure 5:
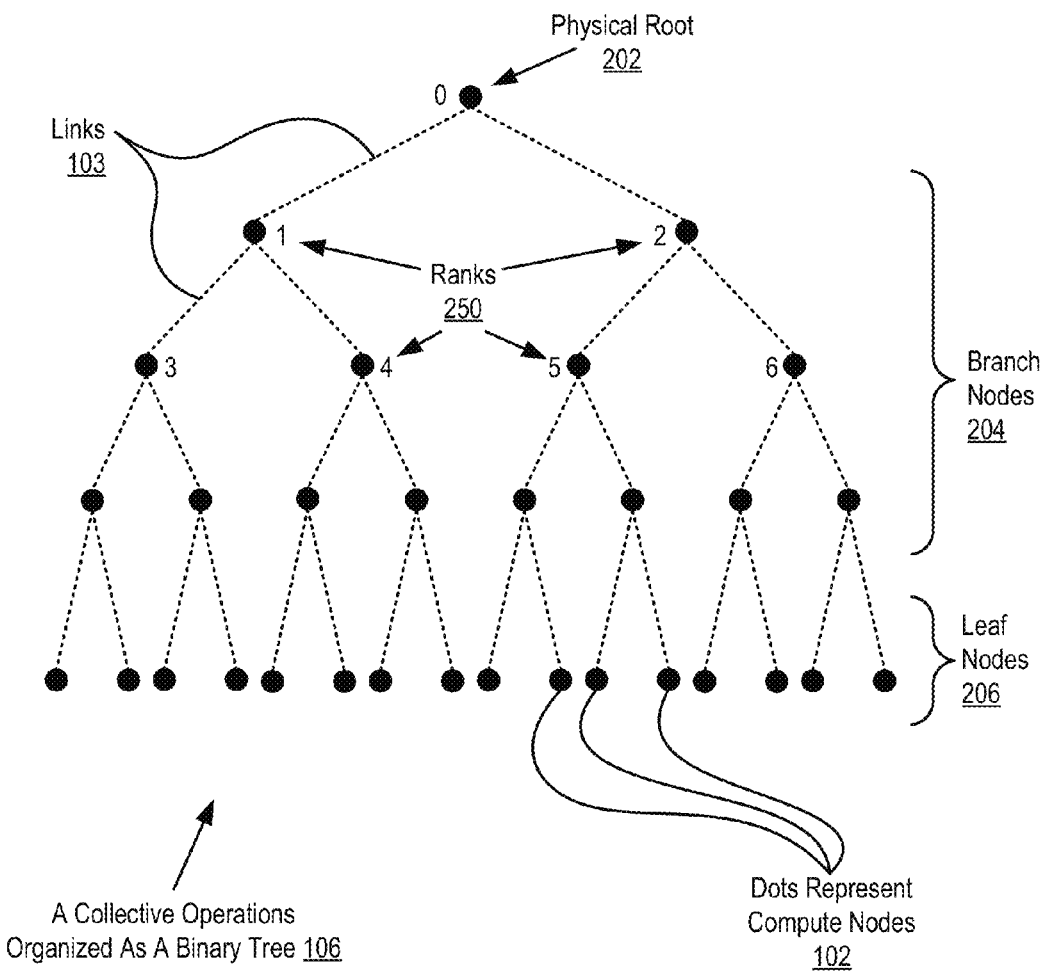
FIG. 5 sets forth a line drawing illustrating an exemplary data communications network optimized for collective operations useful in a parallel computer capable of providing full point-to-point communications among compute nodes of an operational group in a global combining network according to embodiments of the present invention.

For further explanation, FIG. 5 sets forth a line drawing illustrating an exemplary data communications network (106) optimized for collective operations useful in a parallel computer capable of providing full point-to-point communications among compute nodes of an operational group in a global combining network in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for providing full point-to-point communications among compute nodes of an operational group in a global combining network accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figures 6A, 6B, 6C:
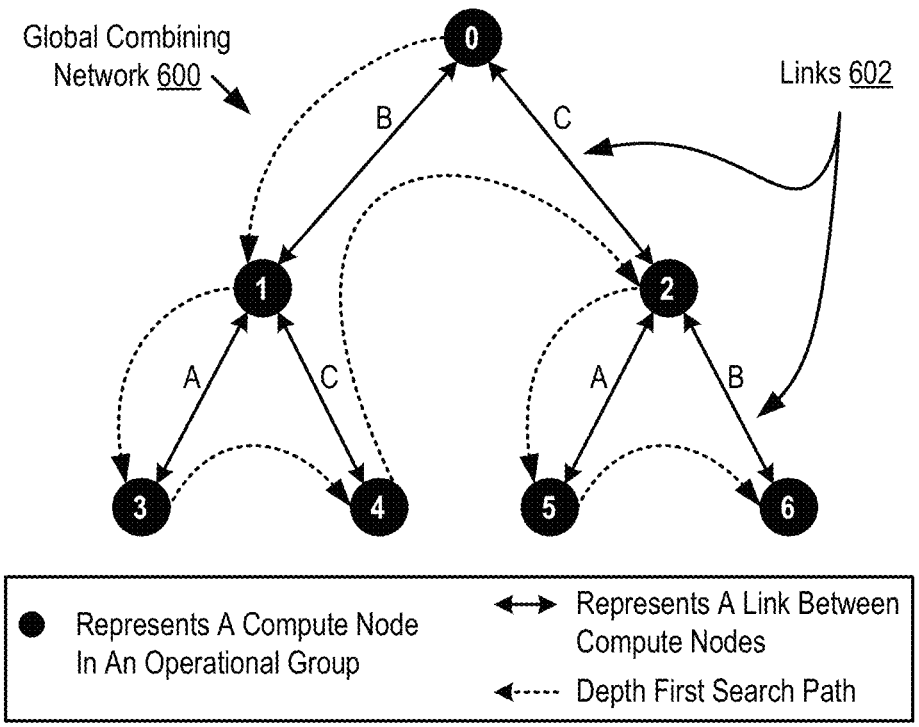
FIG. 6A sets forth a line drawing illustrating exemplary links between compute nodes in a parallel computer capable of providing full point-to-point communications among compute nodes of an operational group in a global combining network according to embodiments of the present invention.
FIG. 6B sets forth a line drawing illustrating an exemplary forwarding table useful in a parallel computer capable of providing full point-to-point communications among compute nodes of an operational group in a global combining network according to embodiments of the present invention.
FIG. 6C sets forth a line drawing illustrating an exemplary adjacent node table useful in a parallel computer capable of providing full point-to-point communications among compute nodes of an operational group in a global combining network according to embodiments of the present invention.

For further explanation, FIG. 6A sets forth a line drawing illustrating exemplary links (602) between compute nodes in a parallel computer capable of providing full point-to-point communications among compute nodes of an operational group in a global combining network according to embodiments of the present invention. The global combining network (600) in the example of FIG. 6A connects the compute nodes '0,' '1,' '2,' '3,' '4,' '5,' and '6' together for data communications. Each child node in the tree network (600) is connected to its parent node through a link (602) that provides bi-directional data communications. In the example of FIG. 6A, compute node '0' connects to compute node '1' through a link identified on each node as link 'B.' Compute node '1' connects to compute node '3' through a link identified on each node as link 'A.' Compute node '1' connects to compute node '4' through a link identified on each node as link 'C.' Compute node '0' connects to compute node '2' through a link identified on each node as link 'C.' Compute node '2' connects to compute node '5' through a link identified on each node as link 'A.' Compute node '2' connects to compute node '6' through a link identified on each node as link 'B.'

In the example of FIG. 6A, to provide full point-to-point communications among the compute nodes in the global combining network (600) according to some embodiments of the present invention, the parallel computer determines a network topology for the compute nodes of the operational group in the global combining network (600). The network topology specifies the compute nodes of the operational group in the network (600) and the links (602) in the network (600 used to connect the compute nodes. The parallel computer may determine the network topology for the compute nodes of the operational group in the global combining network (600) using a depth first search. A depth first search is an algorithm for traversing a tree structure that explores as far as possible along a branch of the tree until a node with no children is identified and then backtracks, returning to the most recently traversed node having another unexplored branch. Consider, for example, the global combining network (600) in the example of FIG. 6A in which the parallel computer performs a depth first search through the global combining network (600) starting with the compute node '0.' In such an example, the parallel computer traverses from compute node '0' to compute node '1' and then to compute node '3.' Upon reaching compute node '3,' the parallel computer backtracks to compute node '1' and traverses to compute node '4.' Upon reaching compute node '4,' the parallel computer backtracks to compute node '0' and traverses to compute node '2.' The parallel computer then traverses to compute node '5.' Upon reaching compute node '5,' the parallel computer backtracks to compute node '2' and traverses to compute node '6.'

After determining a network topology for the compute nodes of the operational group in the global combining network (600), the parallel computer may provide full point-to-point communications among the compute nodes in the global combining network (600) according to some embodiments of the present invention by creating, for each compute node of the operational group in dependence upon the network topology, a forwarding table that associates one of the links for the compute node along which to forward network packets to each of the other compute nodes in the operational group. Each compute node may use its forwarding table to select one of the links for the compute node along which to forward the network packet toward its destination compute node.

For further explanation of a forwarding table, FIG. 6B sets forth a line drawing illustrating a further exemplary forwarding table useful in a parallel computer capable of providing full point-to-point communications among compute nodes of an operational group in a global combining network according to embodiments of the present invention. The parallel computer creates the exemplary forwarding table in FIG. 6B for compute node '1' in the example of FIG. 6A in dependence upon the network topology for the global combining network of FIG. 6A. The exemplary forwarding table of FIG. 6B associates one of the links for compute node '1' along which to forward network packets to each of the other compute nodes in the operational group. The exemplary forwarding table for compute node '1' associates a destination node identifier of '0' with link identifier 'B,' which specifies forwarding network packets destined for compute node '0' along link 'B' of compute node '1.'

Figures 7A, 7B, 7C:
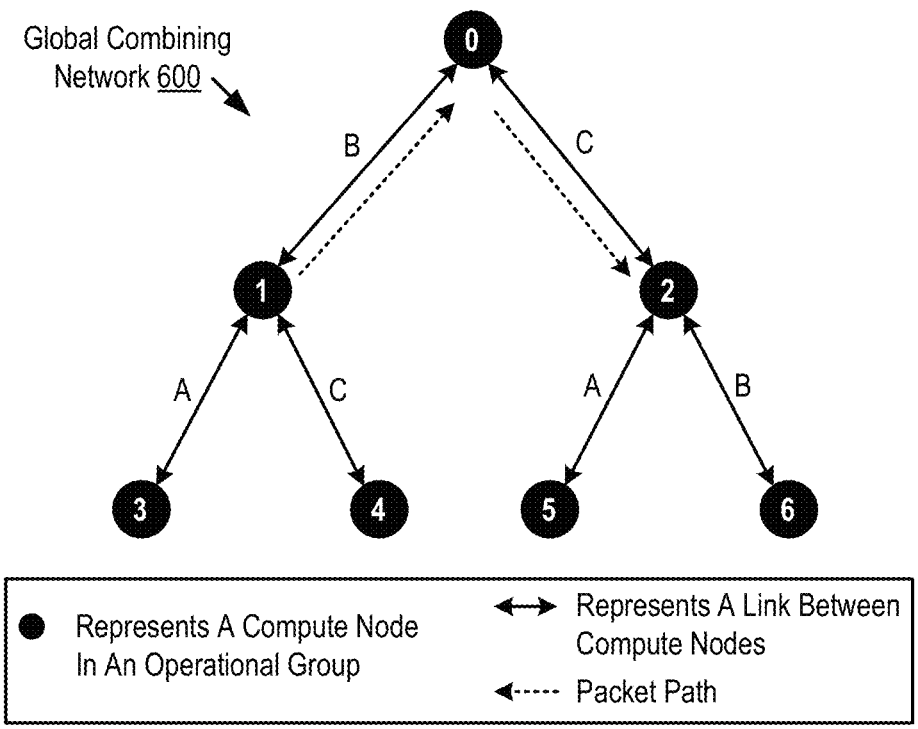
FIG. 7A sets forth a line drawing illustrating an exemplary global combining network useful in a parallel computer capable of providing full point-to-point communications among compute nodes of an operational group in a global combining network according to embodiments of the present invention.
FIG. 7B sets forth a line drawing illustrating a further exemplary forwarding table useful in a parallel computer capable of providing full point-to-point communications among compute nodes of an operational group in a global combining network according to embodiments of the present invention.
FIG. 7C sets forth a line drawing illustrating a further exemplary forwarding table useful in a parallel computer capable of providing full point-to-point communications among compute nodes of an operational group in a global combining network according to embodiments of the present invention.

The exemplary forwarding table for compute node '1' associates a destination node identifier of '2' with link identifier 'B,' which specifies forwarding network packets destined for compute node '2' along link 'B' of compute node '1.' The exemplary forwarding table for compute node '1' associates a destination node identifier of '3' with link identifier 'A,' which specifies forwarding network packets destined for compute node '3' along link 'A' of compute node '1.' The exemplary forwarding table for compute node '1' associates a destination node identifier of '4' with link identifier 'C,' which specifies forwarding network packets destined for compute node '4' along link 'C' of compute node '1.' The exemplary forwarding table for compute node '1' associates a destination node identifier of '5' with link identifier 'B,' which specifies forwarding network packets destined for compute node '5' along link 'B' of compute node '1.' The exemplary forwarding table for compute node '1' associates a destination node identifier of '6' with link identifier 'B,' which specifies forwarding network packets destined for compute node '6' along link 'B' of compute node '1.' A more detailed discussion of how the forwarding table is used in providing full point-to-point communications among compute nodes of an operational group in a global combining network of a parallel computer according to embodiments of the present invention is presented below with reference to FIGS. 7A-C.

Although the parallel computer may create a forwarding table using the network topology in some embodiments of the present invention, in other embodiments of the present invention, the parallel computer may provide full point-to-point communications among the compute nodes in the global combining network (600) by creating, for each compute node of the operational group in dependence upon the network topology, an adjacent node table in dependence upon the network topology. An adjacent node table specifies each of the adjacent nodes to a particular node and the link through which each adjacent node connects to the particular node. Each compute node uses its adjacent node table to select links on which to forward network packets that the compute node receives.

For further explanation of an adjacent node table, FIG. 6C sets forth a line drawing illustrating an exemplary adjacent node table useful in a parallel computer capable of providing full point-to-point communications among compute nodes of an operational group in a global combining network according to embodiments of the present invention. The parallel computer creates the exemplary adjacent node table in FIG. 6C for compute node '1' in the example of FIG. 6A in dependence upon the network topology for the global combining network of FIG. 6A. The exemplary adjacent node table of FIG. 6C specifies each of the adjacent nodes to compute node '1' and the link through which each adjacent node connects to the compute node '1.' In particular, the exemplary adjacent node table of FIG. 6C specifies that compute node '0' connects to compute node '1' through link 'B.' The exemplary adjacent node table of FIG. 6C specifies that compute node '3' connects to compute node '1' through link 'A.' The exemplary adjacent node table of FIG. 6C specifies that compute node '4' connects to compute node '1' through link 'C.' A more detailed discussion of how the adjacent node table is used in providing full point-to-point communications among compute nodes of an operational group in a global combining network of a parallel computer according to embodiments of the present invention is presented below with reference to FIGS. 8A-C.

For further explanation of using a forwarding table to provide full point-to-point communications among compute nodes of an operational group in a global combining network according to embodiments of the present invention, consider FIG. 7A that sets forth a line drawing illustrating an exemplary global combining network useful in a parallel computer capable of providing full point-to-point communications among compute nodes of an operational group in a global combining network according to embodiments of the present invention. The global combining network (600) in the example of FIG. 7A connects the compute nodes '0,' '1,' '2,' '3,' '4,' '5,' and '6' of an operational group together for data communications. Each child node in the tree network (600) is connected to its parent node through a link (602) that provides bi-directional data communications. In the example of FIG. 7A, compute node '0' connects to compute node '1' through a link identified on each node as link 'B.' Compute node '1' connects to compute node '3' through a link identified on each node as link 'A.' Compute node '1' connects to compute node '4' through a link identified on each node as link 'C.' Compute node '0' connects to compute node '2' through a link identified on each node as link 'C.' Compute node '2' connects to compute node '5' through a link identified on each node as link 'A.' Compute node '2' connects to compute node '6' through a link identified on each node as link 'B.'

In the exemplary global combining network (600) of FIG. 7A, compute node '1' creates a network packet that specifies compute node '2' as the destination node. Upon creating the network packet, compute node '1' selects, in dependence upon the destination compute node, one of the links for compute node '1' along which to forward the network packet toward the destination compute node '2.' Compute node '1' selects the link by identifying the link associated with the destination compute node from the forwarding table for compute node '1' illustrated in FIG. 7B. The forwarding table for compute node '1' of FIG. 7B associates link 'B' with compute node '2,' which specifies forwarding network packets destined for compute node '2' along link 'B' of compute node '1.' In the example of FIG. 7A, compute node '1' therefore forwards the network packet along the selected link 'B' to the adjacent compute node '0' connected to compute node '1' through link 'B.'

Upon receiving the network packet in a compute node '0,' compute node '0' selects, in dependence upon the destination compute node, one of the links for compute node '0' along which to forward the network packet toward the destination compute node '2.' Compute node '0' selects the link by identifying the link associated with the destination compute node from the forwarding table for compute node '0' illustrated in FIG. 7C. The forwarding table for compute node '0' of FIG. 7C associates link 'C' with compute node '2,' which specifies forwarding network packets destined for compute node '2' along link 'C' of compute node '0.' In the example of FIG. 7A, compute node '0' therefore forwards the network packet along the selected link 'C' to the adjacent compute node '2' connected to compute node '0' through link 'C.'

Because compute node '2' is the destination compute node, upon receiving the network packet, compute node '2' processes the network packet.

Figures 8A, 8B, 8C, 8D:
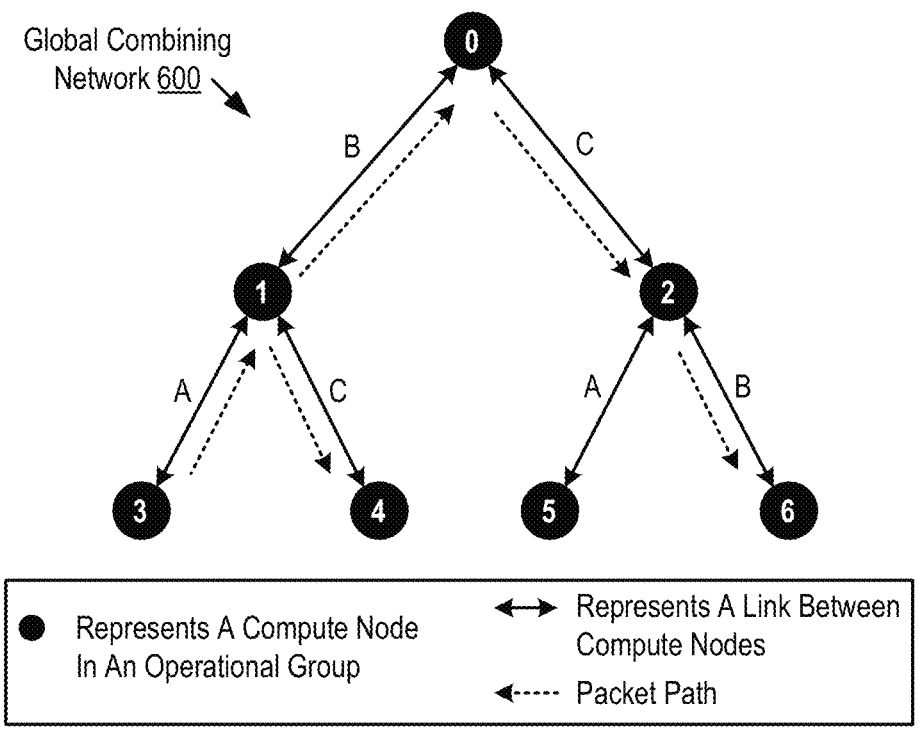
FIG. 8A sets forth a line drawing illustrating a further exemplary global combining network useful in a parallel computer capable of providing full point-to-point communications among compute nodes of an operational group in a global combining network according to embodiments of the present invention.
FIG. 8B sets forth a line drawing illustrating a further exemplary adjacent node table useful in a parallel computer capable of providing full point-to-point communications among compute nodes of an operational group in a global combining network according to embodiments of the present invention.
FIG. 8C sets forth a line drawing illustrating a further exemplary adjacent node table useful in a parallel computer capable of providing full point-to-point communications among compute nodes of an operational group in a global combining network according to embodiments of the present invention.
FIG. 8D sets forth a line drawing illustrating a further exemplary adjacent node table useful in a parallel computer capable of providing full point-to-point communications among compute nodes of an operational group in a global combining network according to embodiments of the present invention.

For further explanation of using an adjacent node table to provide full point-to-point communications among compute nodes of an operational group in a global combining network according to embodiments of the present invention, consider FIG. 8A that sets forth a line drawing illustrating an exemplary global combining network useful in a parallel computer capable of providing full point-to-point communications among compute nodes of an operational group in a global combining network according to embodiments of the present invention. The global combining network (600) in the example of FIG. 8A connects the compute nodes '0,' '1,' '2,' '3,' '4,' '5,' and '6' of an operational group together for data communications. Each child node in the tree network (600) is connected to its parent node through a link (602) that provides bi-directional data communications. In the example of FIG. 8A, compute node '0' connects to compute node '1' through a link identified on each node as link 'B.' Compute node '1' connects to compute node '3' through a link identified on each node as link 'A.' Compute node '1' connects to compute node '4' through a link identified on each node as link 'C.' Compute node '0' connects to compute node '2' through a link identified on each node as link 'C.' Compute node '2' connects to compute node '5' through a link identified on each node as link 'A.' Compute node '2' connects to compute node '6' through a link identified on each node as link 'B.'

In the exemplary global combining network (600) of FIG. 8A, compute node '3' creates a network packet that specifies compute node '6' as the destination node. Upon creating the network packet, compute node '1' forwards to the network packet along all of the links for compute node '3,' which in the example of FIG. 8A is only link 'A.' Upon receiving the network packet, compute node '1' selects, in dependence upon the destination compute node '6,' at least one of the links for compute node '1' along which to forward the network packet toward the destination compute node '6.' Compute node '1' selects at least one of the links by determining whether destination compute node '6' is one of the adjacent compute nodes for compute node '1' using the adjacent node table for compute node '1' illustrated in FIG. 8B. Because destination compute node '6' is not one of the adjacent compute nodes for compute node '1,' compute node '1' identifies the receipt link on which the network packet was received and selects all of the links for compute node '1' except the receipt link. In the example of FIG. 8A, compute node '1' then forwards the network packet along the selected links 'B' and 'C' to the adjacent compute nodes '0' and '4,' thereby moving the network packet closer to destination compute node '6.'

Upon receiving the network packet, compute node '0' selects, in dependence upon the destination compute node '6,' at least one of the links for compute node '0' along which to forward the network packet toward the destination compute node '6.' Compute node '0' selects at least one of the links by determining whether destination compute node '6' is one of the adjacent compute nodes for compute node '0' using the adjacent node table for compute node '0' illustrated in FIG. 8C. Because destination compute node '6' is not one of the adjacent compute nodes for compute node '0,' compute node '0' identifies the receipt link on which the network packet was received and selects all of the links for compute node '0' except the receipt link. In the example of FIG. 8A, compute node '0' then forwards the network packet along the selected link 'C' to the adjacent compute node '2,' thereby moving the network packet closer to destination compute node '6.'

Upon receiving the network packet, compute node '2' selects, in dependence upon the destination compute node '6,' at least one of the links for compute node '2' along which to forward the network packet toward the destination compute node '6.' Compute node '2' selects at least one of the links by determining whether destination compute node '6' is one of the adjacent compute nodes for compute node '2' using the adjacent node table for compute node '2' illustrated in FIG. 8D. Because destination compute node '6' is one of the adjacent compute nodes for compute node '2,' compute node '0' selects link 'B' to the destination compute node '6.' In the example of FIG. 8A, compute node '2' then forwards the network packet along the selected link 'B' to the adjacent compute node '6,' at which point the network packet arrives at the destination compute node.

As mentioned above, providing full point-to-point communications among compute nodes of an operational group in a global combining network of a parallel computer according to the present invention may be implemented using a forwarding table. For further explanation of using a forwarding table, FIG. 9 sets forth a flow chart illustrating an exemplary method for providing full point-to-point communications among compute nodes of an operational group in a global combining network of a parallel computer according to the present invention. The exemplary parallel computer includes a global combining network (600) that is comprised of a plurality of compute nodes connected together through links. The exemplary parallel computer also includes a service node (900). The service node (900) of FIG. 9 provides services common to the plurality of compute nodes in the network (600), configuration of compute nodes, program loading into the compute nodes' memory, instructions to initiate program execution on the compute nodes, results retrieval from program operations on the computer nodes, and so on.

Figure 9:
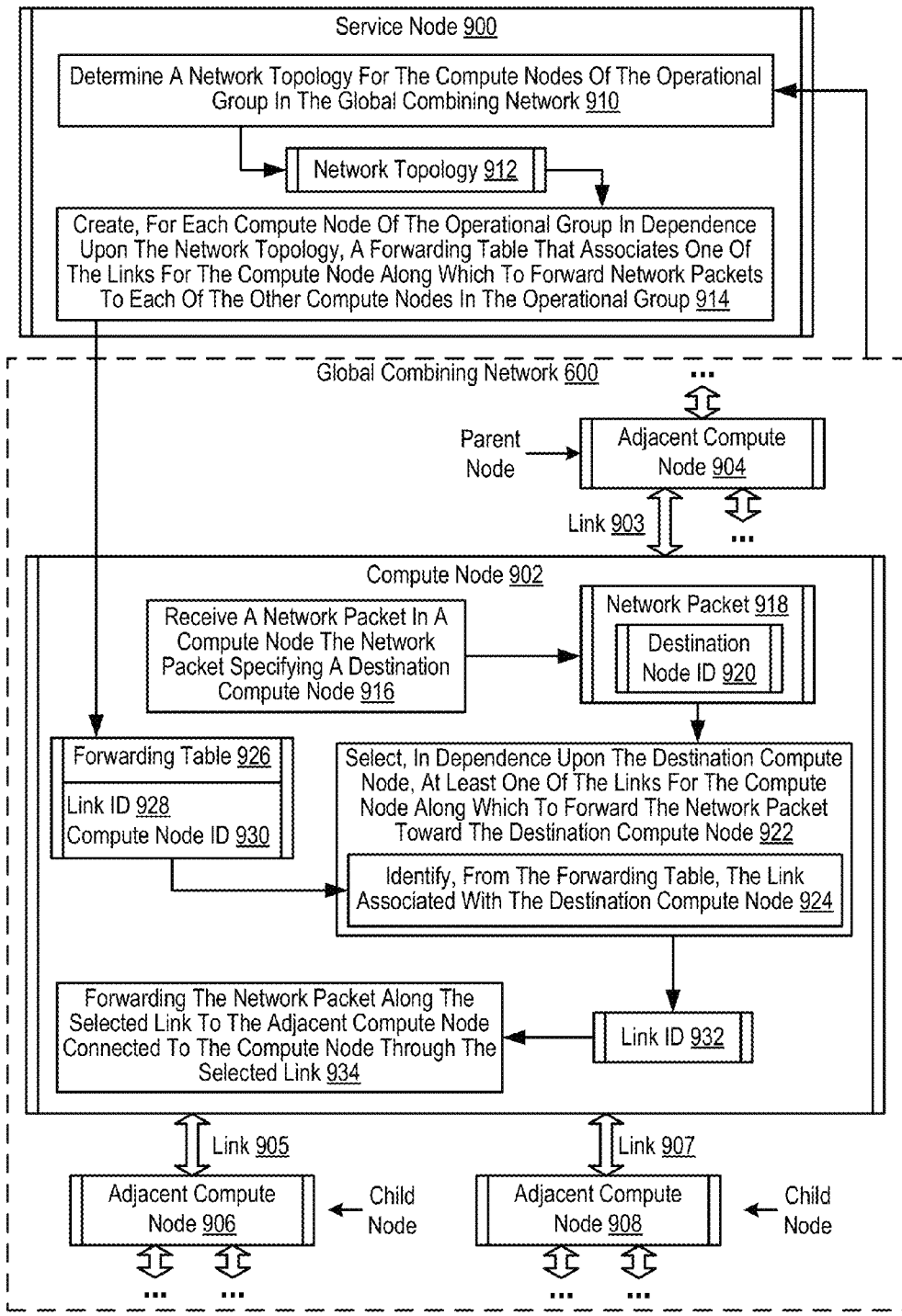
FIG. 9 sets forth a flow chart illustrating an exemplary method for providing full point-to-point communications among compute nodes of an operational group in a global combining network of a parallel computer according to the present invention.

In the exemplary global combining network (600) of FIG. 9, each compute node is connected to each adjacent compute node through a link. The compute node (902) of FIG. 9 is connected to adjacent compute node (904) through link (903). The adjacent compute node (904) is the parent node of compute node (902) in the global combining network (106). The compute node (902) of FIG. 9 is connected to adjacent compute node (906) through link (905) and is connected to adjacent compute node (908) through link (907). The adjacent compute nodes (906, 908) are children node of compute node (902) in the global combining network (600). For clarity, readers will note that FIG. 9 does not illustrate all of the compute nodes of the operational group that may be connected together in the global combining network (600). The omitted compute nodes are represented using the symbol ' . . . ' in FIG. 9.

The method of FIG. 9 includes determining (910), by the service node (900), a network topology (912) for the compute nodes of the operational group in the global combining network (600). The network topology (912) of FIG. 9 specifies the compute nodes of the operational group in the global combining network (600) and the links that connect those compute nodes. The network topology (912) may be represented using, for example, the Graph Description Language ('GDL'), the eXtensible Graph Markup and Modeling Language ('XGMML'), C++ objects, Java objects, or any other representation as will occur to those of skill in the art. The service node (900) may determine (910) a network topology (912) for the compute nodes of the operational group in the global combining network (600) according to the method of FIG. 9 by traversing through the compute nodes in the global combining network (600) using a depth first search to identify all of the compute nodes of the operational group in the network (600) and the links between those nodes.

The method of FIG. 9 also includes creating (914), by the service node (900) for each compute node of the operational group in dependence upon the network topology (912), a forwarding table that associates one of the links for the compute node along which to forward network packets to each of the other compute nodes in the operational group. The service node (900) may create (914) a forwarding table for each compute node according to the method of FIG. 9 by storing each compute node's forwarding table in the compute node itself or storing each compute node's forwarding table in an input/output node supporting the compute node. Storing each compute node's forwarding table in an input/output node supporting the compute node may be useful in some embodiments where the compute nodes only have a small amount of memory available for storing data.

In the example of FIG. 9, the service node (900) creates (914) a forwarding table (926) for the compute node (902) of the operational group in the global combining network (600). The forwarding table (926) of FIG. 9 associates one of the links (903, 905, 907) for the compute node (920) along which to forward network packets to each of the other compute nodes in the operational group. That is, each record of the forwarding table (926) of FIG. 9 represent a link along which to forward network packet destined for a particular compute node of the operational group in the network (600). Each record of the forwarding table (926) of FIG. 9 includes a link identifier (928) and a compute node identifier (930). The compute node identifier (930) of FIG. 9 represents another compute node in the operational group of the global combining network (600). The link identifier (928) of FIG. 9 represents the link for the compute node (902) along which to forward network packets destined for the compute node specified by the associated identifier (930).

The method of FIG. 9 includes receiving (916) a network packet (918) in a compute node (902). The network packet (918) of FIG. 9 specifies a destination compute node using a destination node identifier (920). The compute node (902) may receive (916) a network packet (918) according to the method of FIG. 9 by creating the network packet itself or by retrieving a network packet from the network (600) that was transmitted by one of the adjacent compute nodes (904, 906, 908).

The method of FIG. 9 also includes selecting (922), by the compute node (902) in dependence upon the destination compute node specified by the network packet (918), at least one of the links (903, 905, 907) for the compute node (902) along which to forward the network packet (918) toward the destination compute node. The compute node (902) selects (922) at least one of the links (903, 905, 907) for the compute node (902) in dependence upon the destination compute node specified by the network packet (918) according to the method of FIG. 9 by identifying (924), from the forwarding table (926), the link associated with the destination compute node. The link identifier (932) of FIG. 9 represents the link associated with the destination compute node in the forwarding table (926). In the example of FIG. 9, the link identifier (932) contains a value that identifies link (903), link (905), or link (907).

The method of FIG. 9 includes forwarding (934), by the compute node (902), the network packet (918) along the selected link to the adjacent compute node connected to the compute node (902) through the selected link. The compute node (902) forwards (934) the network packet (918) along the selected link to the adjacent compute node according to the method of FIG. 9 by injecting the network packet into injection stacks of the network adapter for the compute node (902) that correspond with the link specified by the link identifier (932). For example, if the link identifier (932) specifies link (903), then the compute node (902) forwards (934) the network packet (918) along link (903) to adjacent compute node (904). If the link identifier (932) specifies link (905), then the compute node (902) forwards (934) the network packet (918) along link (905) to adjacent compute node (906). If the link identifier (932) specifies link (907), then the compute node (902) forwards (934) the network packet (918) along link (907) to adjacent compute node (908).

Figure 10:
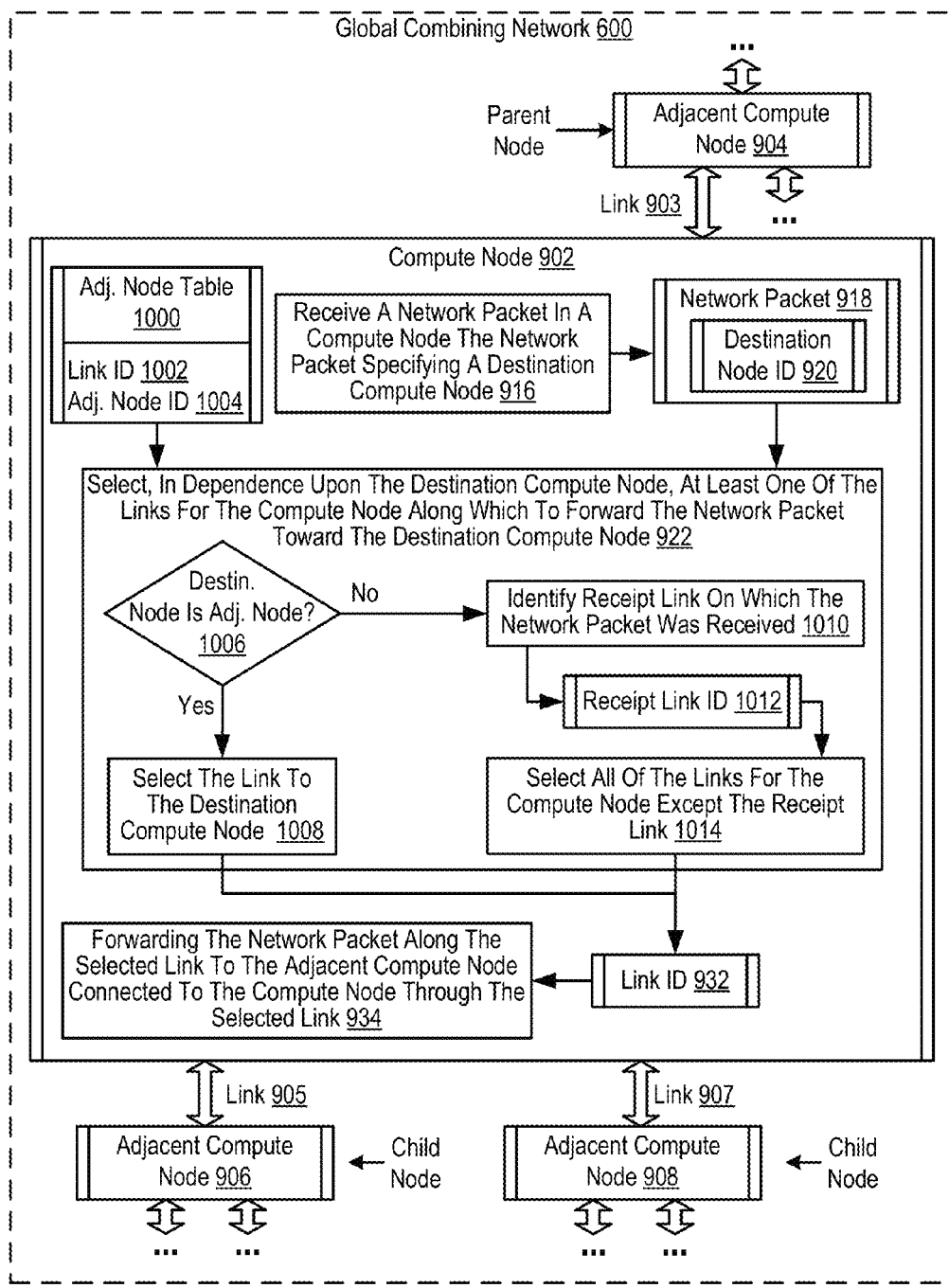
FIG. 10 sets forth a flow chart illustrating a further exemplary method for providing full point-to-point communications among compute nodes of an operational group in a global combining network of a parallel computer according to the present invention.

As mentioned above, providing full point-to-point communications among compute nodes of an operational group in a global combining network of a parallel computer according to the present invention may be implemented using an adjacent node table. For further explanation of using an adjacent node table, FIG. 10 sets forth a flow chart illustrating a further exemplary method for providing full point-to-point communications among compute nodes of an operational group in a global combining network of a parallel computer according to the present invention. In the exemplary global combining network (600) of FIG. 10, each compute node is connected to each adjacent compute node through a link. The compute node (902) of FIG. 10 is connected to adjacent compute node (904) through link (903). The adjacent compute node (904) is the parent node of compute node (902) in the global combining network (106). The compute node (902) of FIG. 10 is connected to adjacent compute node (906) through link (905) and is connected to adjacent compute node (908) through link (907). The adjacent compute nodes (906, 908) are children node of compute node (902) in the global combining network (600).

The example of FIG. 10 includes an adjacent node table (1000). The adjacent node table (1000) of FIG. 10 may be created by a service node using a network topology and stored on the compute node as discussed above. The adjacent node table (1000) of FIG. 10 specifies each of the adjacent compute nodes (904, 906, 908) of the operational group for compute node (902) and the link through which each adjacent node (904, 906, 908) connects to compute node (902). Each record of the adjacent node table (1000) of FIG. 10 specifies an adjacent compute node and the link through which that particular adjacent compute node connects to compute node (902) through the network (600). In the example of FIG. 10, each record of the adjacent node table (1000) includes a link identifier (1002) and an adjacent node identifier (1004). The adjacent node identifier (1004) of FIG. 10 specifies a compute node in the operational group that is adjacent to the compute node (902) in the network (600). That is, a connection path exists between the compute node (902) and the adjacent compute node does not traverse any intervening nodes. The link identifier (1002) of FIG. 10 specifies the link for the compute node (902) that connects the compute node (902) with the adjacent compute node specified by the associated adjacent node identifier (1004).

The method of FIG. 10 includes receiving (916) a network packet (918) in a compute node (902). The network packet (918) of FIG. 10 specifies a destination compute node using a destination node identifier (920). The compute node (902) may receive (916) a network packet (918) according to the method of FIG. 10 by creating the network packet itself or by retrieving a network packet from the network (600) that was transmitted by one of the adjacent compute nodes (904, 906, 908).

The method of FIG. 10 also includes selecting (922), by the compute node (902) in dependence upon the destination compute node specified by the network packet (918), at least one of the links (903, 905, 907) for the compute node (902) along which to forward the network packet (918) toward the destination compute node. The compute node (902) specifies the selected links using one or more link identifiers (932). The compute node (902) selects (922) at least one of the links (903, 905, 907) for the compute node (902) in dependence upon the destination compute node specified by the network packet (918) according to the method of FIG. 10 by determining (1006) whether the destination compute node is one of the adjacent compute nodes (904, 906, 908) for the compute node (902) and selecting (1008) the link to the destination compute node if the destination compute node is one of the adjacent compute nodes (904, 906, 908) for the compute node (902).

The compute node (902) may determine (1006) whether the destination compute node is one of the adjacent compute nodes (904, 906, 908) for the compute node (902) according to the method of FIG. 9 by identifying whether the value for the destination node identifier (920) matches a value for an adjacent node identifier (1004) in the adjacent node table (1000) for the compute node (902). If the value for the destination node identifier (920) matches a value for an adjacent node identifier (1004) in the adjacent node table (1000), then the destination compute node is one of the adjacent compute nodes (904, 906, 908) for the compute node (902). The destination compute node is not one of the adjacent compute nodes (904, 906, 908) for the compute node (902), however, if the value for the destination node identifier (920) does not matches a value for an adjacent node identifier (1004) in the adjacent node table (1000).

The compute node (902) also selects (922) at least one of the links (903, 905, 907) for the compute node (902) in dependence upon the destination compute node specified by the network packet (918) according to the method of FIG. 10 by identifying (1010) a receipt link on which the network packet (918) was received by the compute node (902) and selecting (1014) all of the links for the compute node (902) except the receipt link if the destination compute node is not one of the adjacent compute nodes (904, 906, 908) for the compute node (902). The compute node (902) may identify (1010) the receipt link on which the network packet (918) was received by determining which reception stack in the network adapter for the compute node (902) the packet (918) was stored when the network adapter retrieved the packet (918) from the global combining network (600). Typically, each link (903, 905, 907) has dedicated reception stacks for temporarily storing received network packets awaiting processing by the compute node (902). In other embodiments, the compute node (902) may identify (1010) the receipt link on which the network packet (918) was received by looking up the link in the adjacent node table (1000) that corresponds to the adjacent node that forwarded the packet (918) to the compute node (902).

The method of FIG. 10 includes forwarding (934), by the compute node (902), the network packet (918) along the selected link to the adjacent compute node connected to the compute node (902) through the selected link. The compute node (902) forwards (934) the network packet (918) along the selected link to the adjacent compute node according to the method of FIG. 10 by injecting the network packet into injection stacks of the network adapter for the compute node (902) that correspond with the links specified by the link identifiers (932). For example, if the link identifier (932) specifies link (903), then the compute node (902) forwards (934) the network packet (918) along link (903) to adjacent compute node (904). If the link identifier (932) specifies link (905), then the compute node (902) forwards (934) the network packet (918) along link (905) to adjacent compute node (906). If the link identifier (932) specifies link (907), then the compute node (902) forwards (934) the network packet (918) along link (907) to adjacent compute node (908).

Exemplary embodiments of the present invention are described largely in the context of a fully functional parallel computer system for providing full point-to-point communications among compute nodes of an operational group in a global combining network. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for providing full point-to-point communications among compute nodes of an operational group in a global combining network of a parallel computer, the method comprising:
 receiving a network packet in a compute node of a parallel computer, wherein the parallel computer comprises a plurality of compute nodes coupled for point-to-point data communications in a global combining network, the global combining network comprises a binary tree, each compute node is coupled to each adjacent compute node in the global combining network through a link, and the network packet specifies a destination compute node;
 selecting, in dependence upon the destination compute node, at least one of the links for the compute node along which to forward the network packet toward the destination compute node, each link comprising an exclusive, dedicated data communications connection between a single compute node and one adjacent compute node, including:
 identifying a receipt link on which the network packet was received by the compute node; determining whether the destination compute node is one of the adjacent compute nodes for the compute node; and selecting all of the links for the compute node except the receipt link if the destination compute node is not one of the adjacent compute nodes for the compute node; and
 forwarding the network packet along the selected link to the adjacent compute node connected to the compute node through the selected link.

2. The method of claim 1 wherein:
 the method further comprises: determining a network topology for the compute nodes of the operational group in the global combining network, and creating, for each compute node of the operational group in dependence upon the network topology, a forwarding table that associates one of the links for the compute node along which to forward network packets to each of the other compute nodes in the operational group; and
 selecting, in dependence upon the destination compute node, at least one of the links for the compute node along which to forward the network packet toward the destination compute node further comprises identifying, from the forwarding table, the link associated with the destination compute node.

3. The method of claim 2 wherein creating, for each compute node of the operational group in dependence upon the network topology, a forwarding table further comprises storing each compute node's forwarding table in the compute node.

4. The method of claim 2 wherein creating, for each compute node of the operational group in dependence upon the network topology, a forwarding table further comprises storing each compute node's forwarding table in an input/output node supporting the compute node.

5. The method of claim 1 wherein selecting, in dependence upon the destination compute node, at least one of the links for the compute node along which to forward the network packet toward the destination compute node further comprises:
 determining whether the destination compute node is one of the adjacent compute nodes for the compute node; and
 selecting the link to the destination compute node if the destination compute node is one of the adjacent compute nodes for the compute node.

6. A parallel computer for providing full point-to-point communications among compute nodes of an operational group in a global combining network, each compute node connected to each adjacent compute node in the global combining network through a link, the parallel computer comprising a plurality of computer processors and computer memory operatively coupled to the computer processors, the computer memory having disposed within it computer program instructions capable of:

receiving a network packet in a compute node of a parallel computer, wherein the parallel computer comprises a plurality of compute nodes coupled for point-to-point data communications in a global combining network, the global combining network comprises a binary tree, each compute node is coupled to each adjacent compute node in the global combining network through a link, and the network packet specifies a destination compute node;

selecting, in dependence upon the destination compute node, at least one of the links for the compute node along which to forward the network packet toward the destination compute node, each link comprising an exclusive, dedicated data communications connection between a single compute node and one adjacent compute node, including:

identifying a receipt link on which the network packet was received by the compute node; determining whether the destination compute node is one of the adjacent compute nodes for the compute node; and selecting all of the links for the compute node except the receipt link if the destination compute node is not one of the adjacent compute nodes for the compute node; and forwarding the network packet along the selected link to the adjacent compute node connected to the compute node through the selected link.

7. The parallel computer of claim 6 wherein:

the computer memory also has disposed within it computer program instructions capable of: determining a network topology for the compute nodes of the operational group in the global combining network, and creating, for each compute node of the operational group in dependence upon the network topology, a forwarding table that associates one of the links for the compute node along which to forward network packets to each of the other compute nodes in the operational group; and selecting, in dependence upon the destination compute node, at least one of the links for the compute node along which to forward the network packet toward the destination compute node further comprises identifying, from the forwarding table, the link associated with the destination compute node.

8. The parallel computer of claim 7 wherein creating, for each compute node of the operational group in dependence upon the network topology, a forwarding table further comprises storing each compute node's forwarding table in the compute node.

9. The parallel computer of claim 7 wherein creating, for each compute node of the operational group in dependence upon the network topology, a forwarding table further comprises storing each compute node's forwarding table in an input/output node supporting the compute node.

10. The parallel computer of claim 6 wherein selecting, in dependence upon the destination compute node, at least one of the links for the compute node along which to forward the network packet toward the destination compute node further comprises:

determining whether the destination compute node is one of the adjacent compute nodes for the compute node; and selecting the link to the destination compute node if the destination compute node is one of the adjacent compute nodes for the compute node.

11. A computer program product for providing full point-to-point communications among compute nodes of an operational group in a global combining network of a parallel computer, each compute node connected to each adjacent compute node in the global combining network through a link, the computer program product disposed upon a non-transitory computer readable recordable medium, the computer program product comprising computer program instructions capable of:

receiving a network packet in a compute node of a parallel computer, wherein the parallel computer comprises a plurality of compute nodes coupled for point-to-point data communications in a global combining network, the global combining network comprises a binary tree, each compute node is coupled to each adjacent compute node in the global combining network through a link, and the network packet specifies a destination compute node;

selecting, in dependence upon the destination compute node, at least one of the links for the compute node along which to forward the network packet toward the destination compute node, each link comprising an exclusive, dedicated data communications connection between a single compute node and one adjacent compute node, including:

identifying a receipt link on which the network packet was received by the compute node; determining whether the destination compute node is one of the adjacent compute nodes for the compute node; and selecting all of the links for the compute node except the receipt link if the destination compute node is not one of the adjacent compute nodes for the compute node; and forwarding the network packet along the selected link to the adjacent compute node connected to the compute node through the selected link.

12. The computer program product of claim 11 wherein:

the computer program product further comprises computer program instructions capable of: determining a network topology for the compute nodes of the operational group in the global combining network, and creating, for each compute node of the operational group in dependence upon the network topology, a forwarding table that associates one of the links for the compute node along which to forward network packets to each of the other compute nodes in the operational group; and selecting, in dependence upon the destination compute node, at least one of the links for the compute node along which to forward the network packet toward the destination compute node further comprises identifying, from the forwarding table, the link associated with the destination compute node.

13. The computer program product of claim 12 wherein creating, for each compute node of the operational group in dependence upon the network topology, a forwarding table further comprises storing each compute node's forwarding table in the compute node.

14. The computer program product of claim 12 wherein creating, for each compute node of the operational group in dependence upon the network topology, a forwarding table further comprises storing each compute node's forwarding table in an input/output node supporting the compute node.

15. The computer program product of claim 11 wherein selecting, in dependence upon the destination compute node, at least one of the links for the compute node along which to forward the network packet toward the destination compute node further comprises:
- determining whether the destination compute node is one of the adjacent compute nodes for the compute node; and
- selecting the link to the destination compute node if the destination compute node is one of the adjacent compute nodes for the compute node.

\* \* \* \* \*